UNITED STATES PATENT OFFICE.

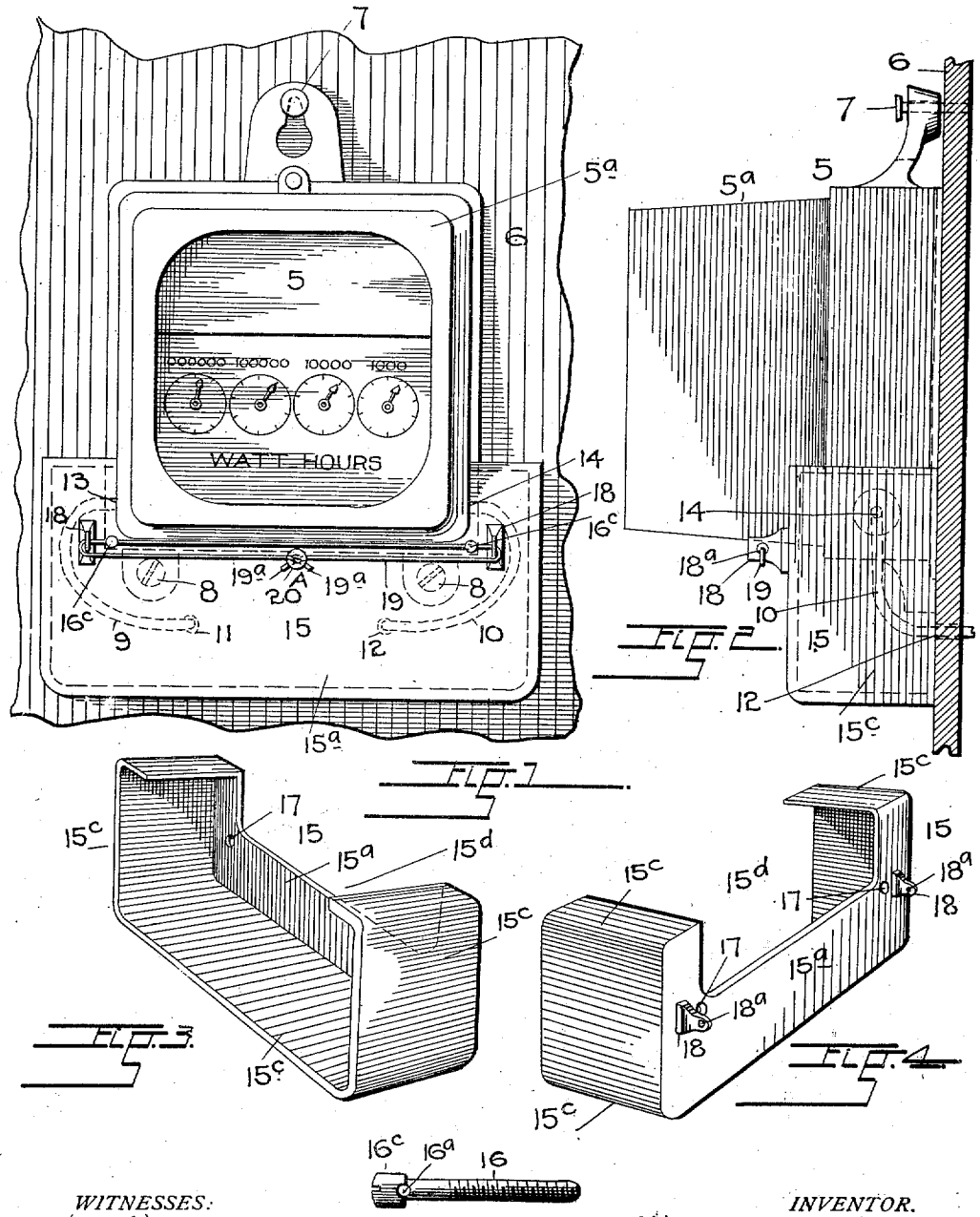

WILLIAM L. SAUNDERS, OF DENVER, COLORADO, ASSIGNOR OF TWO-THIRDS TO DANIEL K. HICKEY, OF DENVER, COLORADO.

ATTACHMENT FOR ELECTRIC METERS.

No. 858,474.

Specification of Letters Patent.

Patented July 2, 1907.

Application filed June 27, 1905. Serial No. 267,280.

*To all whom it may concern:*

Be it known that I, WILLIAM L. SAUNDERS, a citizen of the United States of America, residing at Denver, in the county of Denver and State of Colorado, have invented certain new and useful Improvements in Attachments for Electric Meters, of which the following is a specification.

My invention relates to an attachment for electric meters, its object being to frustrate and detect any attempt made by unauthorized or maliciously inclined persons at tampering with the exposed portions of the so-called loop wires which extend from the wall to the electric meter.

To this end I provide a suitable, preferably metal covering, which, inclosing the exposed portion of the above named wires, may be sealed by the person or company furnishing the electricity, the consumed quantity of which is measured by the meter. The seal, which may bear the company's imprint, must be ruptured in the act of unfastening or removing the casing and thus indicates the fact of its being improperly opened or tampered with, which leads to the ready detection of any attempt made to reach the inclosed wires. In case the covering incloses the lower part of the meter, as in the form illustrated in the accompanying drawing, an incidental advantage is gained by its rendering the screws which secure the cap of the meter to its back plate inaccessible and preventing unauthorized opening of the meter-casing.

Having thus briefly explained the objects and nature of my attachment, I will now proceed to describe the same in detail, reference being had to the accompanying drawings in the several views of which, like parts have been similarly designated and in which, Figure 1—represents a front elevation of an electric meter provided with my attachment, the loop-wires being shown in broken lines, Fig. 2—a side elevation of the same, Fig. 3—a perspective interior view of the attachment, Fig. 4—a similar exterior view of the same, and Fig. 5—one of the screws used to secure my attachment to the meter.

Let 5 designate an electric meter attached to the wall 6 by screws or nails 7 and 8. 9 and 10 are the loop-wires which leading to and from the meter form part of the main circuit through which the current of electricity flows from the generating station to the consumer. Wires 9 and 10 have been shown to pass through the wall at points 11 and 12 and to enter and leave meter 5 at 13 and 14.

15 designates my attachment which consists of a suitable casing or covering adapted to inclose the exposed parts of wires 9 and 10 and held in its normal position by headed screws 16. Screws 16, passing through apertures 17 in the casing, are secured in a convenient portion of the meter, or if necessary, in the wall against which the meter is placed. Casing 15 consists of a front plate $15^a$ and an integral surrounding side $15^c$, a recess $15^d$ being cut in its upper portion, which permits it to embrace the lower part of the meter-cap $5^a$. Extending outwardly from front plate $15^a$ in alinement with the bolt holes 17, are apertured lugs 18 which afford means to seal screws 16 after the casing has been placed in position. The sealing is effected by a cord or wire 19, which passes through the apertures $18^a$ in lugs 18 and corresponding holes $16^a$ in the heads $16^c$ of the screw-bolts 16. The ends $19^a$ of wire 19 are brought together as at A and united by a seal 20, made of lead, wax or other suitable substance and which as explained, may bear the imprint of the owner or owners of the meter.

It should be understood that the form and arrangement of the casing may be varied to conform with differently constructed meters or to inclose the wires in case they enter or leave the meter at different points from those shown in the drawings.

The bolts or other fastenings employed to secure the attachment may also be sealed in any convenient manner and within the spirit of my object, viz. to frustrate tampering with the exposed parts of the loop-wires between the wall and the meter by insuring detection of any attempt thereto.

Having thus described my invention what I claim is:

1. The combination with an electric meter having service wires emerging therefrom of detachable casing arranged to inclose the exposed portions of the said wires extending between the meter and the wall against which it is placed.

2. The combination with an electric meter having service wires emerging therefrom of a suitable covering adapted to inclose the portions of the said wires extending between the meter and the wall against which it is placed, and means to detect removal of said covering.

3. The combination with an electric meter having service wires emerging therefrom of a casing adapted to inclose the portions of the said wires extending between the meter and the wall against which it is placed, means to secure said casing, and means to detect removal of said securing means.

4. The combination with an electric meter having service wires emerging therefrom of a casing adapted to inclose the portions of the said wires extending between the meter and the wall against which it is placed, screw bolts securing said casing, and means to seal said bolts.

5. The combination with an electric meter of a casing adapted to inclose the portions of the wires extending between the meter and the wall against which it is placed, and having apertured projections, apertured screw bolts securing said casing, a cord extending through the apertures of said projections and bolts, and means to unite and seal the extremities of said cord.

In testimony whereof I have affixed my signature in presence of two witnesses.

WILLIAM L. SAUNDERS.

Witnesses:
G. J. ROLLANDET,
K. M. STUMP.